United States Patent Office 3,484,577
Patented Dec. 16, 1969

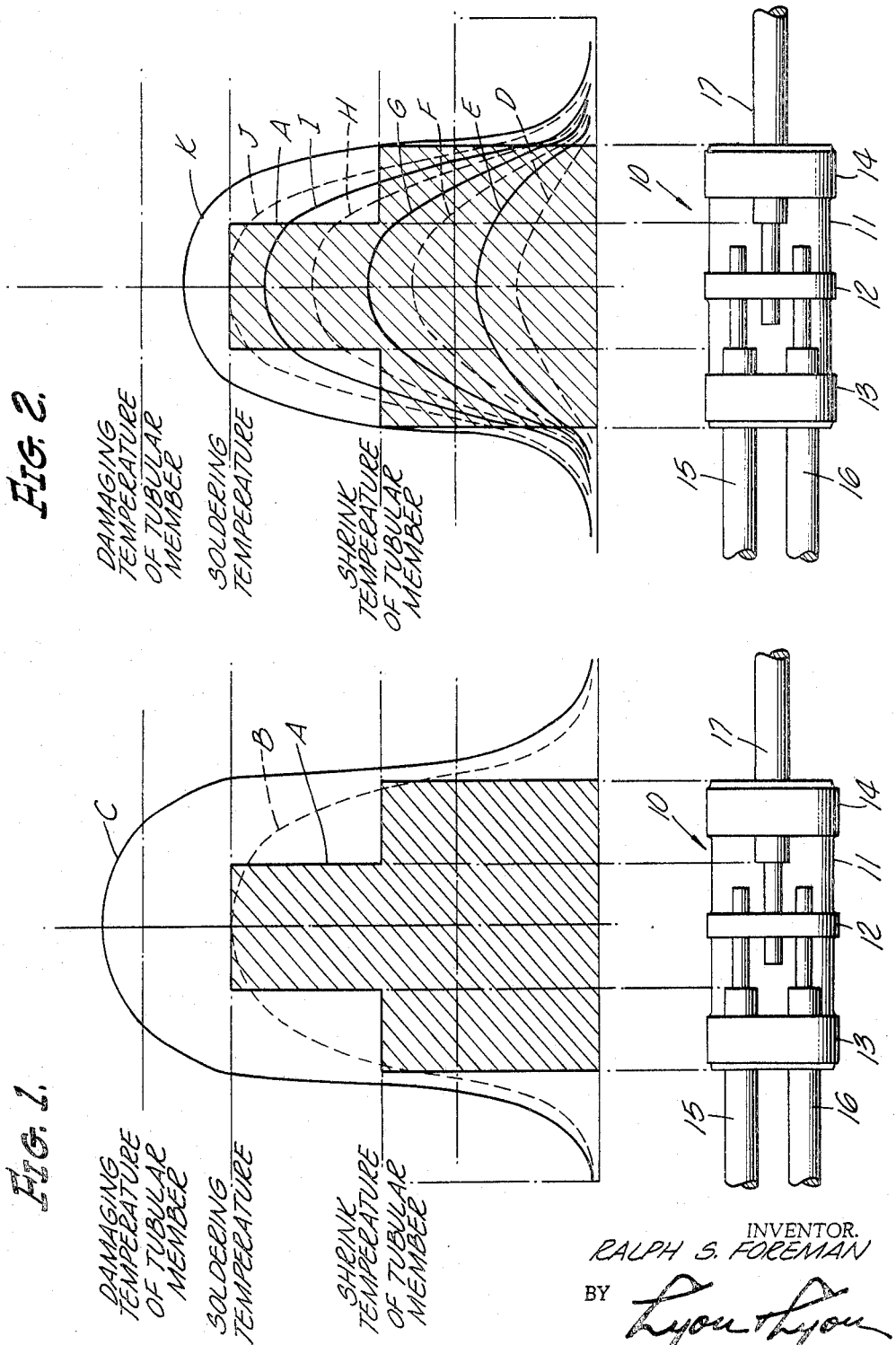

3,484,577
METHOD OF BONDING A WORKPIECE WITHIN A HEAT-RECOVERABLE SLEEVE
Ralph S. Foreman, Los Altos, Calif., assignor to Raychem Corporation, Redwood City, Calif., a corporation of California
Filed Apr. 13, 1967, Ser. No. 630,699
Int. Cl. B23k 1/02, 1/04; H05b 1/00
U.S. Cl. 219—85                                         6 Claims

ABSTRACT OF THE DISCLOSURE

A method of bonding a workpiece within a heat-recoverable sleeve having a heat sink associated therewith by irradiating it with pulsed infrared energy.

BACKGROUND OF THE INVENTION

In U.S. patent application Ser. No. 495,119 now U.S. Patent No. 3,396,455, entitled "Method of Recovering Heat Recoverable Articles," filed Oct. 12, 1965 by Hugh Paul Sherlock there is disclosed a method of installing a heat-recoverable object such as a solder sleeve, that is a dimensionally heat unstable member in which is placed a solder insert. Such solder sleeves are disclosed in U.S. Patent No. 3,243,211 to Wetmore, the disclosure of which is incorporated by reference herein, as is the disclosure of the aforementioned Sherlock application.

In general such dimensionally heat unstable members or sleeves are made of a material having the property of plastic or elastic memory and are expanded under heat and pressure to a diameter greater than their normal diameter and cooled while kept under pressure. A sleeve treated in this manner will retain its expanded position until it is again heated to above its heat recovery temperature at which time it will recover to its original shape. Examples of material useful in forming such dimensionally heat unstable recoverable members may be found in Currie Patent 2,027,962 and Cook et al. Patent 3,086,242, the disclosures of which are incorporated herein by reference. Polymeric materials which have been cross-linked by chemical means or by irradiation, for example, with high energy electrons or nuclear radiation, such as those disclosed in the Cook et al. patent are preferred for use in the present invention. Non-crystalline polymeric materials exhibiting the property of plastic or elastic memory, such as polyurethane, ionomers, etc. could also be used in practicing the present invention. The method of the present invention is equally useful for sleeves made from material having either plastic or elastic memory; consequently, as used herein, the term "elastic memory" and "plastic memory" are used interchangeably and are intended to be mutually inclusive.

Briefly, the Sherlock application discloses and claims a method in which the composition of the sleeve material is so related to the wavelength band of a source of infrared radiation that a fraction of the radiant energy reaching the sleeve will be absorbed by the sleeve material and the remainder passed to a fusible insert positioned therein. The fraction of energy absorbed can be made just large enough to raise the temperature of the sleeve material to its heat recovery temperature just before enough energy has been transmitted to the insert to raise it to its melting or flowing temperature. Some of the energy also is passed through the insert to the object on which the sleeve is to be installed, for example, the braid on a coaxial cable. This permits the object or objects on which the sleeve is to be installed to be raised in temperature, as is desired when a solder joint is to be formed. Consequently, the sleeve will begin to recover just before the insert melts or flows with the result that the sleeve will control the flow of the insert. Since the energy transfer to the insert is substantially instantaneous, the time required for it to reach its melting point, and consequenly the time required for the installation of the sleeve, is greatly reduced as there is no longer dependence upon the thermal conductivity characteristics of the sleeve material. A heating device for carrying out the Sherlock method is disclosed in the Sherlock application and is disclosed and claimed in U.S. patent application Ser. No. 495,125, entitled "Heating Device," filed Oct. 12, 1965 by Ralph S. Foreman et al., the disclosure of which is incorporated by reference herein.

In the heating device of the Foreman et al. application, a lamp is positioned at one focal point of an ellipsoidal reflector which theoretically focuses all of the reflected energy at the second focal point. However, in actual practice, because the lamp in such a device is not a point source, all of the heat energy is not focused at a point but rather a finite temperature band is produced with a maximum temperature at the focal point, the temperature dropping off on either side of the focal point. This bell-shaped energy or temperature profile is quite advantageous when the heating device is used for installing solder sleeves because the greatest amount of energy is applied in the area of the solder insert with lesser amounts on the ends. Thus, the energy or heat is concentrated in the area where it is most needed.

Along with the non-uniform temperature or energy distribution of the Foreman et al. heating device and the energy absorption of the sleeve and inserts, a third variable has been found to be present which has an affect on the proper installation of a solder sleeve. This third variable is the heat sink effect of the wires or objects being soldered. The heat sink effect is dependent upon the thermal conductivity, heat capacity and mass. Generally, the thermal conductivity and heat capacity can be considered constant and therefore the largest concern is with the changes in mass—the larger the mass, the larger the heat sink. By definition, heat flows from a point of higher temperature to a point of lower temperature, the larger the temperature difference between the two points, the faster the heat will be conducted away. While in many applications the mass of the objects being connected are not large enough to harmfully effect the installation of a solder sleeve, when large sizes of wires or other similar objects are being connected, the amount of energy required to complete the solder joint can become so large because of the large heat sink effect that the temperature of the sleeve material is raised to a point where damage occurs before the solder joint is completed.

It can thus be seen that while the composition of the sleeve material and the size of the insert might be properly balanced for the installation of a solder sleeve on two wires, if the sleeve was used to splice three wires together and the same heating time used, the sleeve would recover before the solder joint was completed because the energy transmitted through the sleeve would be insufficient to heat the much larger mass with its consequently larger heat sink effect. One solution to this situation would be to increase the heating time. However, because the sleeve continues to absorb energy during the heating cycle, it can become heated to the point where damage occurs. Such damage usually first appears as visible surface damage which reduces the transmission of infrared energy through it thus increasing the absorption of energy and further complicating the problem.

A long heating cycle also often results in damage to the insulation of the conductors being terminated, particularly where the insulation readily absorbs radiant energy. Another solution to this situation would be to use more transparent sleeving material. However, other considerations, both technical and economic, rule out this approach in many instances.

SUMMARY OF THE INVENTION

According to the present invention, the difficulties discussed above are overcome by intermittently pumping energy into the sleeve, the insert, and the objects to be connected in such a manner that they are differentially heated, that is, each cycle composed of heating or "on" and non-heating or "off" periods causes the temperature of the insert and the objects to be connected to be incrementally raised a greater amount than is the sleeve, the temperature of the sleeve never being raised above the damage point. The intermittent heating is continued until the temperature of the solder joint components and the sleeve become high enough to cause recovery of the sleeve and melting or flowing of the insert.

BRIEF DESCRIPTION OF THE DRAWING

FIGURE 1 illustrates the temperature distributions along a solder sleeve as a result of a single prolonged application of radiant energy; and FIGURE 2 illustrates the temperature distributions along a solder sleeve as a result of short multiple bursts of energy in accordance with the present invention.

DESCRIPTION OF THE INVENTION

The method of this invention is particularly useful in connection with the operation of the heating device shown in the aforementioned Foreman et al. application. It should be understood, however, that any suitable heating device that produces a relatively well concentrated beam or spot of radiant energy can also be used in connection with the present invention. All that is required to modify a device such as that shown in the Foreman et al. application is the provision of a timer than can be programmed to energize and de-energize the heating device according to a preselected schedule. Such timers are conventional and are readily available commercially.

As pointed out above, the schedule by which the particular heating device used is energized and de-energized is selected to differentially heat the sleeve and the solder joint components so that the solder joint (comprising the insert and the objects to be connected) is raised to proper soldering temperature without the sleeve being raised above the temperature at which damage occurs to it. During the latter part of the intermittent heating cycle (just before melting or flowing of the insert) the sleeve must be raised to above its recovery temperature so that it can control the flow of the insert. Essentially what occurs during each of the cycles is that the temperature of the sleeve is raised a certain amount for a given "on" period while the temperature of the solder joint is raised another amount. During the "off" period, the temperature of the sleeve does not increase and in fact decreases slightly and heat is conducted down the objects to be connected to points of lower temperature. During successive "on" periods, the temperature of the sleeve is gradually in a stepwise fashion raised to a temperature above its recovery temperature but below that at which visible damage occurs. Also, with each successive "on" period, less heat is conducted away from the solder joint components because the temperature difference between the area being soldered and some points remote from the joint is less. The heat sink effect therefore is reduced by a sort of preconditioning or preheating during the initial "on" periods without damage to the sleeve occurring, until the temperatures of the solder joint and the sleeve become high enough to cause recovery of the sleeve and melting or flowing of the insert.

Referring now to the drawing, FIGURE 1 shows the temperature distribution along a solder sleeve as the result of a single prolonged application of radiant energy when the sleeve is being installed on objects which represent a large heat sink. In FIGURE 1, a typical solder sleeve generally indicated at 10 includes a heat recoverable tubular member 11, a solder insert 12, and fusible inserts 13 and 14. A pair of insulated electrical conductors 15 and 16 are inserted into one end of the solder sleeve 10 and a third insulated conductor 17 is inserted into the other end. As disclosed in the aforementioned Wetmore patent, when the solder sleeve 10 is heated toward the melting temperature of the solder insert 12, the fusible inserts 13 and 14 first melt to form dams to prevent extrusion of the solder out of the sleeve and the tubular member 11 then begins to recover toward its original shape. The solder insert 12 then melts forming an insulated soldered connection between the conductive portions of the conductors 15, 16 and 17.

The ideal temperature distribution along the length of the solder sleeve 10 is shown by the curve A associated with the solder sleeve 10 in FIGURE 1. As can be seen, it is desired that the greatest amount of heat energy be supplied to the area of the sleeve 10 which contains the solder insert 12 and the exposed conductive portions of the electrical conductors 15, 16 and 17 which represent a large heat sink. Lesser amounts of heat energy should be directed at the ends of the sleeve 10 to cause fusible inserts 13 and 14 to melt and the ends of the tubular member 11 to recover.

Curve B (dotted lines) of FIGURE 1 shows the temperature distribution of the solder joint components when a single, continuous "on" period is used to provide the required heat energy. Curve B is a bell-shaped curve of the type which is developed by a heating device such as that disclosed in the aforementioned Foreman et al. application where an ellipsoidal reflector is used in combination with a non-point source of energy. Curve C (solid lines) of FIGURE 1 shows the temperature distribution over the length of the tubular member 11 and the wire insulation of the conductors 15, 16 and 17 beyond the ends of the sleeve if a continuous, single "on" period is used so as to produce the solder joint temperature distribution of Curve B. It can be seen that the sleeve damage temperature is reached by the time the solder joint components reach the soldering temperature.

FIGURE 2 illustrates the temperature distribution effects on the same solder sleeve shown in FIGURE 1 of short multiple bursts of energy in accordance with the present invention. In FIGURE 2, the ideal temperature distribution Curve A is again shown. The other curves of this figure show the results achieved by using four short bursts of energy of equal duration. As in FIGURE 1, the curves shown in dotted lines represent the temperature distribution of the solder joint components while the curves shown in solid lines show the temperature distribution over the length of the tubular member 11. The first burst of energy causes the temperature distribution of the solder joint components to be as shown by the Curve D while the temperature distribution over the length of the tubular member 11 is shown by the Curve E.

The next burst of energy causes the temperature distribution of the joint components to be raised in a manner shown by Curve F and the temperature distribution of the tubular member to be raised to that shown by Curve G. As can be seen, the second burst of energy increases the temperature of the joint components by a greater amount than did the first burst but increases the temperature of the tubular member by a lesser amount than did the first burst. As pointed out above, this results because of a decrease in the heat sink effect of the solder joint components and the decrease in conduction of heat away from them because the points of the conductors 15, 16 and 17 remote from the interior of the sleeve have been raised in temperature and this effect is not substantially effected by the "off" period. The temperature of the tubular member, however, is reduced somewhat during the "off" period, primarily through conduction to the solder joint components.

The next burst of energy causes the temperature distribution of the joint components and the tubular member to become as shown by Curves H and I respectively while the last burst of energy causes these temperature distributions to be raised to the levels shown in Curves J and K respectively. As can be seen, Curve J corresponds to Curve B of FIGURE 1 and therefore the joint components are at the proper temperature for soldering. As shown in Curve K, the temperature of the tubular member 11 has been raised above its recovery temperature but has not been raised to the damaging temperature. It will be noted in FIGURE 2 that each incremental increase in temperature of the tubular member is less than the preceding incremental increase while each corresponding increase in the temperature of the joint components is greater than the immediately preceding increase.

Since a particular heating cycle, both with respect to the number of energy bursts and the duration of the "on" and "off" periods, must be chosen for each solder sleeve installation (or class of installation having generally the same characteristics) it is impossible to set forth here the parameters for each such cycle. However, it is believed that the selection of such parameters will be obvious to those skilled in the art after being apprised of the principles of the present invention. In order to make these principles even clearer, the following examples of typical cycles are given for the guidance of those skilled in the art who wish to practice the invention. Each of the examples given illustrate the changes in the heating cycle that are required when more or different size conductors or wires are used, that is, when the heat sink is increased. In each of the examples, the designations such as D–100–20 refer to the solder sleeve used. Each of the sleeves designated is sold by Rayclad Tubes, Inc., of Redwood City, California.

parent to those skilled in the art that various modifications and changes may be made without departing from the essence of the invention. It is therefore intended that all such modifications and changes as come within the true scope and spirit of the appended claims are intended to be covered thereby.

What I claim is:

1. A method of bonding a workpiece within a heat-recoverable sleeve comprising, disposing a fusible insert on said workpiece, irradiating said sleeve, fusible insert and workpiece with radiant energy, the wavelength band of said energy being such that said sleeve absorbs a fraction of said energy and transmits the remainder to said fusible insert and workpiece, and periodically interrupting said irradiation, each said interruption occurring prior to the sleeve reaching its degradation temperature, until the temperature of said sleeve is raised to its recovery temperature and the temperature of said insert is raised to its fusion temperature.

2. A method of bonding a workpiece within a heat-recoverable sleeve comprising, disposing a fusible insert on said workpiece, irradiating said sleeve, fusible insert and workpiece with a burst of radiant energy, the wavelength band of said energy being such that the sleeve absorbs a fraction of said energy and transmits the remainder to said insert and workpiece, said burst having a duration such that the heat content of said fusible insert and workpiece is raised but said sleeve is not heated to a temperature at which degradation occurs thereto; again irradiating said sleeve, fusible insert and workpiece with a burst of radiant energy, the duration of said burst being such that the heat content of said workpiece and said insert is further raised, but said sleeve is not heated to a temperature at which degradation occurs thereto; and continuing to irradiate said sleeve, fusible insert and workpiece with spaced bursts of said radiant energy having durations insufficient to heat said sleeve to the temperature at which degradation occurs thereto, but further raising the heat content of said fusible insert and workpiece until said sleeve is heated to its recovery temperature and said insert is caused to melt.

EXAMPLE I

| Wire AWG: | Two Conductors | Three Conductors | Four Conductors |
|---|---|---|---|
| 22 | D–100–20, 6 bursts at ½ sec | D–100–20, 6 bursts at ½ sec | D–101–20, 5 bursts at ¾ sec. |

EXAMPLE II

| 20 | D–100–20, 6 bursts at ½ sec | D–101–20, 5 bursts at ¾ sec | D–101–20, 5 bursts at ¾ sec. |

EXAMPLE III

| 18 | D–101–20, 5 bursts | D–101–20, 5 bursts at ¾ sec | D–101–20, 6 bursts at ¾ sec. |

EXAMPLE IV

| 16 | D–101–20, 6 bursts at ¾ sec | D–101–20, 6 bursts at ¾ sec | D–103–20, 6 bursts at 1 sec. |

EXAMPLE V

| 14 | D–101–20, 6 bursts at ¾ sec | D–103–20, 6 bursts at 1 sec | D–103–20, 6 bursts at 1¼ sec. |

In each of the above examples, the stranding for all AWG wire sizes was 19, the wire was all MIL–W–5086A, Type I, and the delay between bursts was approximately one second.

From the foregoing description, it can be seen that a method has been provided for installing heat recoverable members having fusible inserts on an object or objects which represent a large heat sink without causing damage to the sleeve. While the description has been couched in terms of installing a solder sleeve for the purpose of clarity, it should be understood that the invention is equally useful where the fusible insert is other than solder and a large heat sink effect is present. It should be understood that what has been described is a preferred embodiment of the present invention, and that it will be ap- 3. The method of claim 2 wherein said bursts of energy are spaced such that said member cools to a greater degree than said means and said insert whereby each succeeding burst of energy raises the temperature of said member by a lesser amount than the preceding burst and raises the temperature of said means by a greater amount than preceding burst.

4. The method of claim 3 wherein each of said bursts are of substantially the same duration.

5. The method of claim 4 wherein the spacing between each of said bursts are of substantially the same duration.

6. The method of claim 2 wherein said member, said insert and said means are irradiated with a band of infrared energy extending along the length thereof, said energy bond having a maximum heat energy value coinciding with the location of said insert.

References Cited

UNITED STATES PATENTS

| | | | |
|---|---|---|---|
| 2,231,695 | 2/1941 | Vedder | 219—50 X |
| 2,400,472 | 5/1946 | Strickland | 219—50 X |
| 3,243,211 | 3/1966 | Wetmore. | |
| 3,283,124 | 1/1966 | Kawecki | 219—347 |
| 3,374,531 | 3/1968 | Bruce. | |
| 3,396,455 | 8/1968 | Sherlock | 219—347 |

JOSEPH V. TRUHE, Primary Examiner

L. A. SCHUTZMAN, Assistant Examiner

U.S. Cl. X.R.

29—498; 219—347